(12) United States Patent
Dunbar et al.

(10) Patent No.: US 7,539,393 B2
(45) Date of Patent: May 26, 2009

(54) METHOD AND SYSTEM FOR REVERSE PLAYBACK OF COMPRESSED DATA

(75) Inventors: Geoffrey T. Dunbar, Kirkland, WA (US); Alexandre V. Grigorovitch, Redmond, WA (US); Chih-Iung Bruce Lin, Redmond, WA (US); Wei-Ge Chin, Issaquah, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 773 days.

(21) Appl. No.: 10/729,863

(22) Filed: Dec. 5, 2003

(65) Prior Publication Data

US 2005/0141861 A1 Jun. 30, 2005

(51) Int. Cl.
*H04N 5/91* (2006.01)
(52) U.S. Cl. ...................................................... 386/68
(58) Field of Classification Search ................... 386/68, 386/75, 112; 375/232, 240; 360/32
See application file for complete search history.

(56) References Cited

U.S. PATENT DOCUMENTS

| | | | | |
|---|---|---|---|---|
| 4,661,862 A | * | 4/1987 | Thompson | 386/112 |
| 4,689,697 A | * | 8/1987 | Wilkinson | 386/75 |
| 5,193,004 A | * | 3/1993 | Wang et al. | 375/240.14 |
| 5,298,992 A | | 3/1994 | Pietras et al. | |
| 5,341,474 A | | 8/1994 | Gelman et al. | |
| 5,377,051 A | | 12/1994 | Lane et al. | |
| 5,414,455 A | | 5/1995 | Hooper et al. | |
| 5,535,008 A | | 7/1996 | Yamagishi et al. | |
| 5,574,566 A | | 11/1996 | Takakura et al. | |
| 5,694,172 A | * | 12/1997 | Miyano | 375/240.13 |
| 5,892,882 A | | 4/1999 | Kuroda et al. | |
| 5,959,796 A | | 9/1999 | Matsumi et al. | |
| 6,014,706 A | | 1/2000 | Cannon et al. | |
| 6,058,241 A | | 5/2000 | Kawamura et al. | |
| 6,101,070 A | | 8/2000 | Oguro | |
| 6,167,083 A | | 12/2000 | Sporer et al. | |
| 6,201,927 B1 | * | 3/2001 | Comer | 386/68 |
| 6,247,072 B1 | | 6/2001 | Firestone | |

(Continued)

FOREIGN PATENT DOCUMENTS

EP 0605115 7/1994

(Continued)

OTHER PUBLICATIONS

Doh, et al; "Fast Forward and Fast Rwind Play System Based on the MPEG System Stream with New Concept"; 1999; IEEE; pp. 846-850.

(Continued)

*Primary Examiner*—Thai Tran
*Assistant Examiner*—Hung Q Dang
(74) *Attorney, Agent, or Firm*—Lee & Hayes, PLLC

(57) ABSTRACT

A request is received to play compressed video data in a reverse direction. A process identifies a most recent key frame received and decodes the most recent key frame. The process then identifies delta frames received after the most recent key frame and decodes these identified delta frames. The decoded delta frames are then played in the reverse direction. Additionally, compressed audio data can be decoded and played in the reverse direction along with the video data.

17 Claims, 10 Drawing Sheets

U.S. PATENT DOCUMENTS

| | | |
|---|---|---|
| 6,269,117 B1 * | 7/2001 | Peng .................... 375/232 |
| 6,327,421 B1 | 12/2001 | Tiwari et al. |
| 6,654,539 B1 | 11/2003 | Duruoz et al. |
| 2002/0015577 A1 | 2/2002 | Negishi et al. |
| 2002/0181588 A1 | 12/2002 | Okada |
| 2003/0007556 A1 * | 1/2003 | Oura et al. ............ 375/240.01 |
| 2003/0093801 A1 | 5/2003 | Lin et al. |
| 2004/0179597 A1 * | 9/2004 | Rault ................... 375/240.08 |

FOREIGN PATENT DOCUMENTS

| | | |
|---|---|---|
| EP | 0653884 | 5/1995 |
| EP | 0676898 | 10/1995 |
| JP | 7202933 | 8/1995 |
| JP | 7284042 | 10/1995 |
| WO | WO95/21414 | 8/1995 |

OTHER PUBLICATIONS

Tan, et al.; "Video Transcoding For Fast Forward/Reverse Video Playback"; IEEE ICIP 2002; pp. I-713 through I-716.

Wee, et al.; "Compressed-Domain Reverse Play of MPEG Video Streams"; Part of the SPIE Conference on Multimedia Systems and Applications; Boston, Massachusetts; Nov. 1998; SPIE vol. 3528; pp. 237-248.

Chen et al. "A Scalable Video-On Demand Service For the Provision of VCR-Like Functions" May 15, 1995, Proceedings of the International Conference on Multimedia Computing and Systems, Washington, pp. 65-72, Institute of Electrical and Electronics Engineers.

* cited by examiner

METHOD AND SYSTEM FOR REVERSE PLAYBACK OF COMPRESSED DATA

TECHNICAL FIELD

The systems and methods described herein relate to the reverse playback of compressed data, such as compressed video and audio data.

BACKGROUND

Various types of multimedia presentations are available to consumers. Multimedia presentations include movies, television programs, advertisements, video conferences, and the like. Multimedia presentations can be retrieved from a storage media, such as a DVD or a hard disk drive, or received via a transmission from a server or other computing device. These multimedia presentations may be presented to a user through a television, computer system, portable entertainment system, or other device.

Multimedia presentations typically utilize compressed video data and compressed audio data to reduce the stored size of the presentation or to reduce the time or bandwidth required to transmit the presentation. The compressed video data and compressed audio data is often decompressed just prior to rendering the video and audio data. Example compression formats include various MPEG (Moving Pictures Expert Group) formats (such as MPEG-2 and MPEG-4), Windows Media Video and Windows Media Audio (WMA).

Typical compression formats are designed for the normal playback of video and audio data in a forward direction. Certain compression formats use a key frame/delta frame structure for storing video data. A key frame can be independently decompressed and rendered without a need to reference previously decompressed frames. Subsequent delta frames identify differences between the current frame and a previously decompressed (reference) frame. Thus, to render a delta-coded video frame the decoding process accesses one or more previously decompressed frames to fully reconstruct the frame. The use of delta-coded frames allows a compression algorithm to take advantage of inter-frame similarities to improve compression efficiency.

The key frame/delta frame structure works well for a forward playback of data. However, in certain situations, a user may desire to play the multimedia presentation in a reverse direction. Reverse playback of data that has been compressed using the key frame/delta frame structure is difficult because the previous key frame(s) and previous delta frame(s) are typically discarded after rendering. Attempting to store all audio and video data is not generally practical due to the time required to decode an entire multimedia presentation and due to the large amount of storage space required to store the entire multimedia presentation.

Accordingly, there is a need for an improved technique for playing compressed video and audio data in a reverse direction.

SUMMARY

The systems and methods described herein provide for the reverse playback of compressed video and compressed audio data. In a particular embodiment, a request is received to play compressed video data in a reverse direction. A process identifies a most recent key frame received and decodes that most recent key frame. The process identifies delta frames received after the most recent key frame and decodes those delta frames. The decoded delta frames are then played in the reverse direction.

BRIEF DESCRIPTION OF THE DRAWINGS

Similar reference numbers are used throughout the figures to reference like components and/or features.

DETAILED DESCRIPTION

The systems and methods discussed herein process various video and/or audio data, such as data contained in a multimedia presentation. A multimedia presentation is any sequence of video data, audio data, or combination of video data and audio data. Example multimedia presentations include movies, television programs, video conferences, concerts, advertisements, and the like. The video and/or audio data is processed such that it can be rendered in a forward direction or a reverse direction (also referred to as a "reverse order").

Although particular examples discussed herein refer to multimedia presentations or multimedia streams of data, the systems and methods discussed herein can be used with any type of compressed video data or compressed audio data from any source (or from multiple sources). For example, data may be read from a storage media such as a DVD, CD, memory device, or hard disk drive. Alternatively, data may be received via a network or other communication link from one or more servers or other data sources. As used herein, "playback" includes rendering any type of data (such as audio data or video data), playing any type of data, or otherwise processing any type of data.

Figure 1:
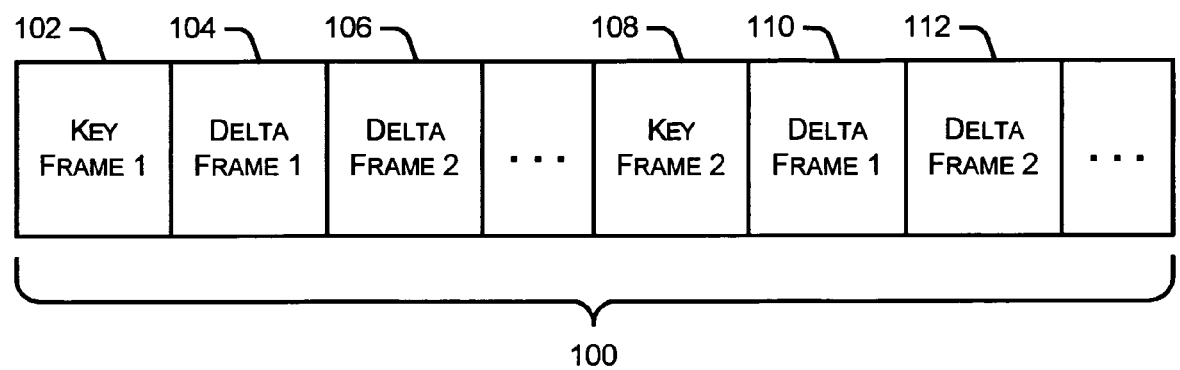
FIG. 1 illustrates an example sequence of frames containing compressed video data.

FIG. 1 illustrates an example sequence 100 of frames containing compressed video data. In this example, sequence 100 includes two key frames 102 and 108. Key frames contain sufficient data to render an entire video frame. Two delta frames 104 and 106 are associated with key frame 102 and two delta frames 110 and 112 are associated with key frame 108. Delta frames identify differences in the video image as compared to an associated key frame or as compared to a previous delta frame. Thus, to render a delta frame, a rendering device needs information regarding the key frame associated with the delta frame and/or information regarding one or more previous delta frames. In one example, to render frame 106, the rendering device uses information related to key frame 102 and delta frame 104. In this example, a decoder maintains information from the decoding process that is necessary to render subsequent frames (e.g., subsequent delta frames).

As illustrated in FIG. 1, when rendering frames in a "forward" direction, the frames are processed from left to right (e.g., process and render key frame 102, process and render delta frame 104, and so forth). A rendering device includes any device capable of processing or presenting video and/or audio data. Example rendering devices include a television, DVD player, CD player, computer system (such as a server, desktop computer, laptop computer, or handheld computer), portable entertainment system, game console, cellular phone, personal digital assistant (PDA), and the like.

Although FIG. 1 illustrates two delta frames associated with each key frame, alternate embodiments may include any number of delta frames associated with each key frame. In one embodiment, video frames are rendered at a rate of 30 frames per second. In this embodiment, one key frame is provided every three seconds such that approximately 90 delta frames (3 seconds×30 frames per second) are provided between successive key frames.

Figure 2:
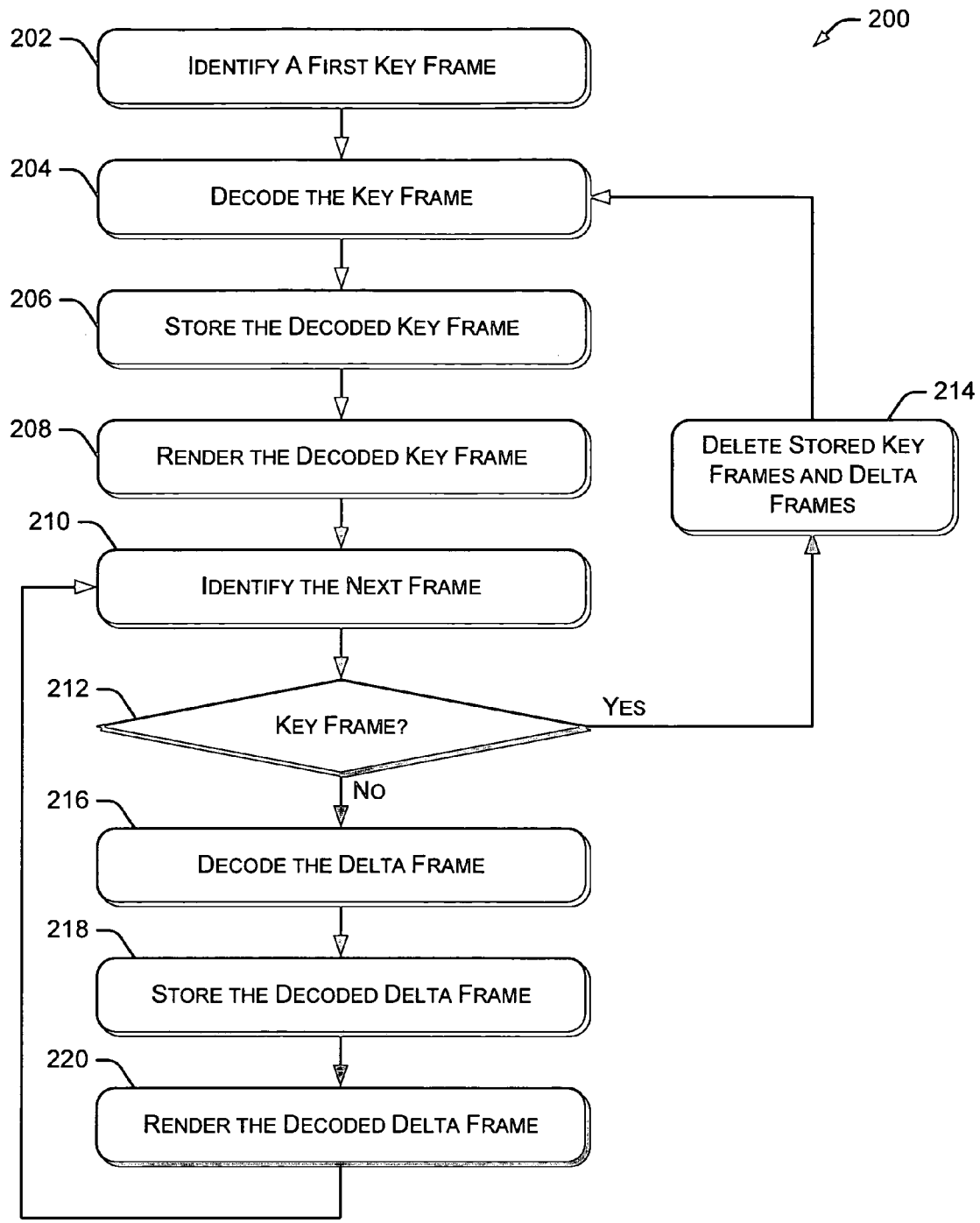
FIG. 2 is a flow diagram illustrating an embodiment of a procedure for playing compressed video data in a forward direction.

FIG. 2 is a flow diagram illustrating an embodiment of a procedure 200 for playing compressed video data in a forward direction. Initially, a first key frame is identified by a rendering device (block 202). The first key frame is decoded (block 204) and stored (block 206) for use in rendering subsequent delta frames. The decoded key frame is then rendered (block 208) on a display device or other system. Procedure 200 continues by identifying the next frame of compressed video data (block 210) and determines whether the next frame is a key frame or a delta frame (block 212). If the next frame is a key frame, any stored key frames and delta frames are deleted (block 214), which releases storage space for storing information related to subsequent key frames and delta frames.

If, at block 212, the next frame is not a key frame (i.e., the next frame is a delta frame), procedure 200 decodes the delta frame (block 216) and stores the decoded delta frame (block 218). The decoded delta frame is then rendered (block 220) using information from the decoded delta frame as well as information from the decoded key frame and any intervening delta frames. Procedure 200 then returns to block 210 to identify the next frame. This process continues until the last frame is processed or a "stop rendering" instruction is received.

Figure 3:
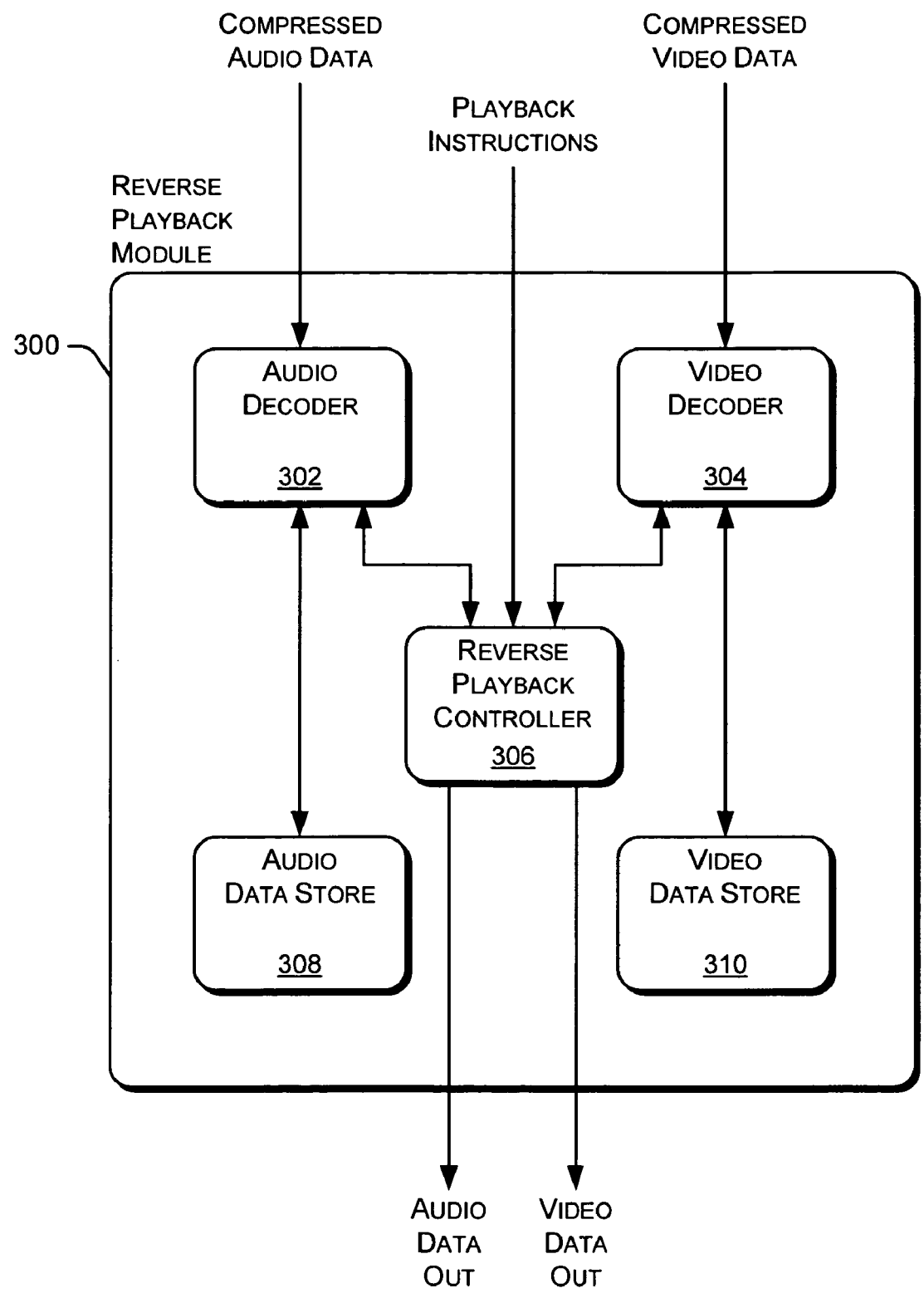
FIG. 3 illustrates an example reverse playback module capable of rendering a series of compressed video frames in reverse order.

FIG. 3 illustrates an example reverse playback module 300 capable of rendering a series of compressed video frames in reverse order. Reverse playback module 300 includes an audio decoder 302 and a video decoder 304 coupled to a reverse playback controller 306. Audio decoder 302 is also coupled to an audio data store 308. For example, audio decoder 302 uses audio data store 308 to store information related to decoded audio data that may be used to decode subsequent audio data. Similarly, video decoder 304 is also coupled to a video data store 310. For example, video decoder 304 uses video data store 310 to store information related to decoded video data that may be used to decode subsequent video data. Audio decoder 302 may also be referred to as an "audio decompressor" or an "audio processor" and video decoder 304 may also be referred to as a "video decompressor" or a "video processor".

Audio decoder 302 receives compressed audio data from one or more data sources (not shown). The compressed audio data is decoded by audio decoder 302, stored (as necessary) in audio data store 308 and provided to reverse playback controller 306. The compressed video data is decoded by video decoder 304, stored (as necessary) in video data store 310 and provided to reverse playback controller 306. Reverse playback controller 306 receives the decoded audio data, the decoded video data and one or more playback instructions (e.g., forward playback, pause, or reverse playback). Reverse playback controller 306 generates audio data output and video data output based on the instructions received regarding how the audio and video data is to be rendered. In a particular embodiment, reverse playback controller 306 processes the audio data output and the video data output such that the audio data is synchronized with the appropriate video data. In this embodiment, the audio data and the video data is timestamped. This timestamp information is used during playback to synchronize the audio data with the video data. The audio data output and video data output are provided to a rendering device, a display device, a storage device, or any other device (s) capable of processing the audio data output and/or video data output.

In alternate embodiments, reverse playback module 300 receives uncompressed audio data and compressed video data. In this embodiment, the uncompressed audio data passes through the audio decoder 302 unchanged, or bypasses the audio decoder 302 and is provided directly to the reverse playback controller 306. The compressed video data is processed as discussed herein.

Figure 4:
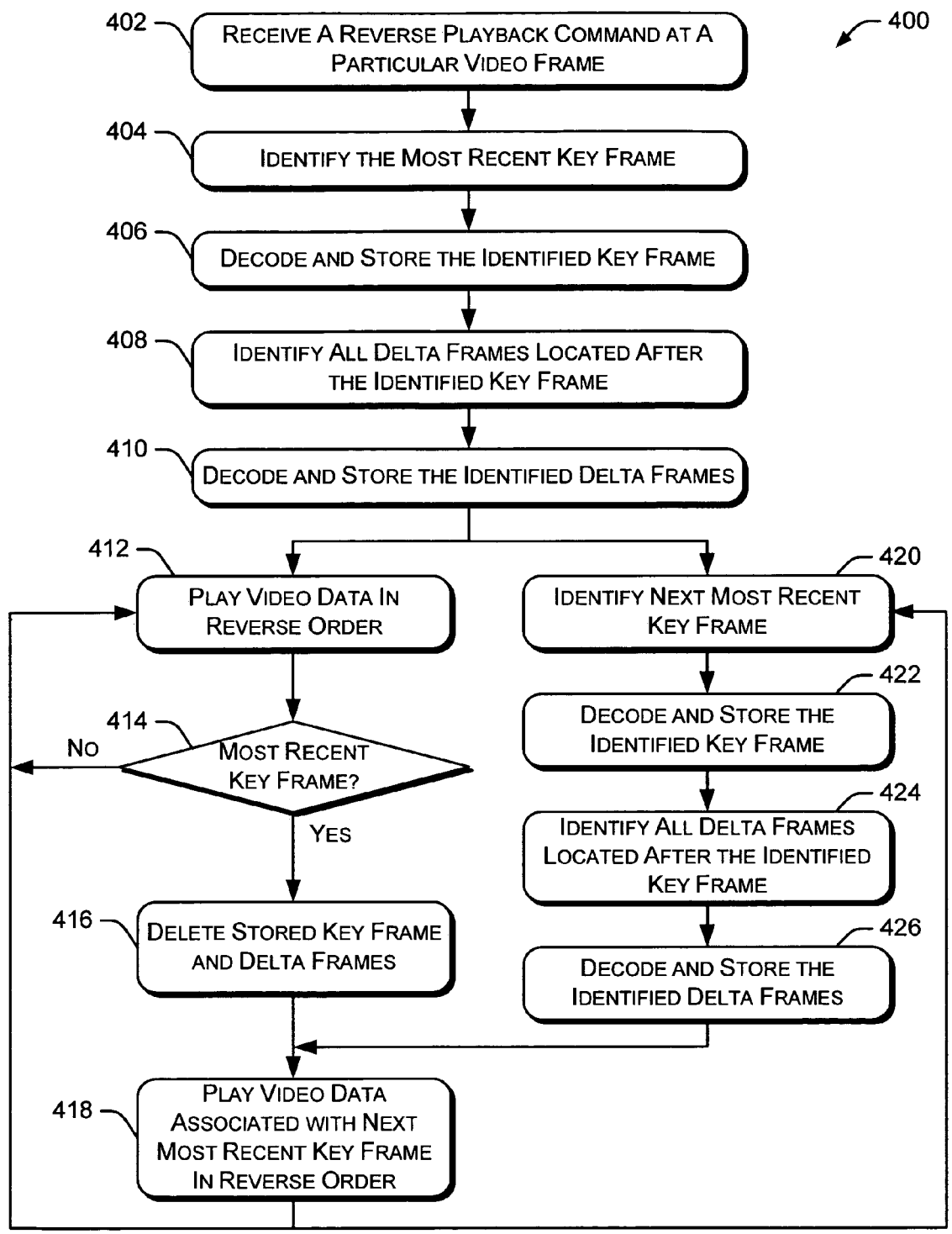
FIG. 4 is a flow diagram illustrating an embodiment of a procedure for playing compressed video data in a reverse direction.

FIG. 4 is a flow diagram illustrating an embodiment of a procedure 400 for playing compressed video data in a reverse direction. Initially, a reverse playback command is received at a particular video frame (block 402). For example, a reverse playback command may be received from a user desiring to "back-up" to a previous video frame or desiring to watch a particular sequence of video frames repeatedly. Procedure 400 identifies the most recent key frame (block 404), i.e., the last key frame received prior to the reverse playback command. The most recent key frame (also referred to as the "identified key frame") is decoded and stored (block 406) for use in decoding subsequent delta frames. The procedure then identifies all delta frames located after the most recent key frame (block 408). These delta frames are the frames that define changes in the image as compared to the most recent key frame and/or any intervening delta frames. The identified delta frames are decoded and stored (block 410) for use in rendering the delta frames and/or decoding subsequent delta frames.

Procedure 400 then branches into two parallel paths that are performed simultaneously. Along one path, the procedure plays video data in reverse order (block 412). The video data is played in reverse order by first rendering the most recent delta frame, then the next most recent frame, and so forth. At block 414, the procedure determines whether the current frame being rendered is a key frame. If not, the procedure continues the reverse playback by rendering the next most recent frame. When the reverse playback reaches a key frame, the procedure branches to block 416, where the stored key frame and subsequent delta frames are deleted (i.e., the key frame and delta frames that were just rendered during the reverse playback). This frame data can be deleted because all of the frames have been rendered. In alternate embodiments, this frame data is saved for future use (e.g., when playing the same frame data in a forward direction).

Along a second path, procedure 400 continues from block 410 to identify a next most recent key frame (block 420). This next most recent key frame is the next earlier key frame than the previously identified key frame (e.g., the key frame identified in block 404). The identified key frame (i.e., the next most recent key frame) is then decoded and stored (block 422)

for use in decoding subsequent delta frames. The procedure then identifies all delta frames located after the identified key frame (block 424). These delta frames are the frames that define changes in the image as compared to the identified key frame and/or any intervening delta frames. The identified delta frames are decoded and stored (block 426) for use in rendering the delta frames and/or decoding subsequent delta frames.

Next, procedure 400 begins playing video data associated with the next most recent key frame in reverse order (block 418). This is accomplished using the key frame information and delta frame information identified, decoded and stored in block 420-426. Once procedure 400 begins playing this video data in reverse order (blocks 412 and 414), the process begins identifying, decoding and storing the next most recent key frame and the delta frames associated with that next most recent key frame (blocks 420-426). Thus, while one group of video data (e.g., a key frame and the delta frames associated with that key frame) are being played in reverse order, procedure 400 is preparing the next group of video data for reverse playback.

Figure 5:
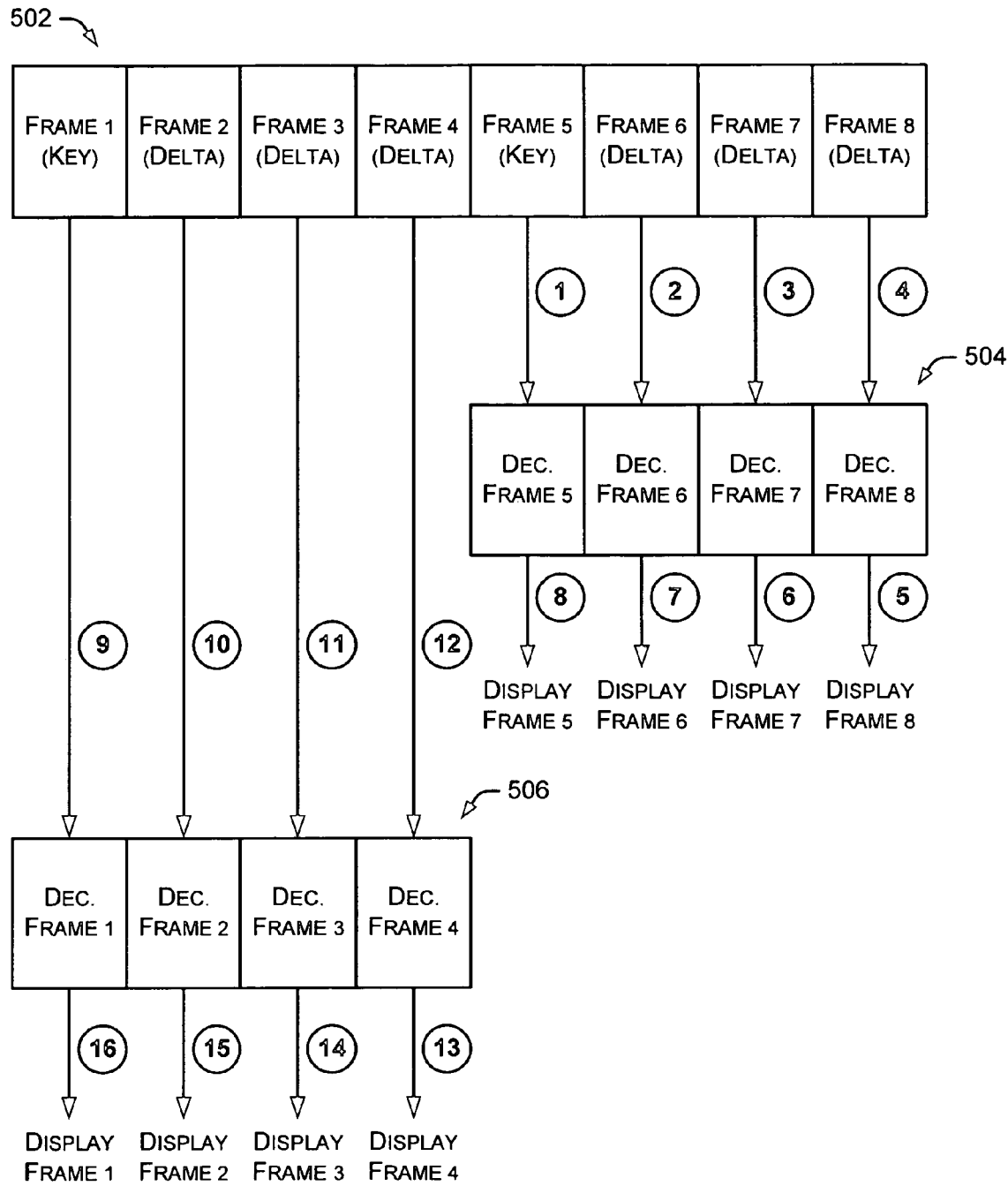
FIG. 5 illustrates an example of processing multiple frames of compressed video data such that the video data is played in a reverse direction.

FIG. 5 illustrates an example of processing multiple frames of compressed video data such that the video data is played in a reverse direction. FIG. 5 includes an example sequence of compressed video frames 502, which includes two key frames (Frame 1 and Frame 5). Each key frame has three associated delta frames (Delta Frames 2-4 are associated with Frame 1 and Delta Frames 6-8 are associated with Frame 5). Frames 1-4 and Frames 5-8 are referred to as "groups" of video data or video frames. Although the sizes of the frames shown in FIG. 5 are approximately equal, different frames may contain different amounts of information. For example, a delta frame typically contains less information than a key frame.

The order in which the sequence of video frames 502 are processed is indicated by numbered circles positioned to the right of the associated process. As mentioned above, the sequence of video frames 502 is played in the reverse direction (i.e., from right to left as shown in FIG. 5). For example, the first frame to be displayed is Frame 8. However, to display Frame 8 (a delta frame), the rendering device must have information regarding Frame 5 (the associated key frame) and the intervening delta frames (Frame 6 and Frame 7). Thus, Frame 5 is decoded, followed by Frame 6, Frame 7 and Frame 8. This process is identified by numbered circles 1-4. The decoded frames (Frames 5-8) are identified as sequence 504. These decoded frames are stored in a memory device or other storage mechanism. The decoded frames may also be referred to as "uncompressed frames".

After Frames 5-8 are decoded, the frames are rendered in reverse order; i.e., Frame 8 followed by Frame 7 followed by Frame 6 followed by Frame 5. This process is identified by numbered circles 5-8. While Frames 8-5 are being rendered, the next group of frames (Frames 1-4) are decoded, as identified by numbered circles 9-12. Typically, the decoding of a video frame requires greater computing resources than rendering a video frame. Thus, the simultaneous decoding and rendering of video frames improves the performance of the reverse playback process. Additionally, this simultaneous decoding and rendering reduces delays between rendering adjacent groups of video data; e.g., delays caused while waiting for all video frames in a group to be decoded before reverse playback of that group of video frames can begin.

The second group of decoded frames (Frames 1-4) are identified as sequence 506 and are also stored in a memory device or other storage mechanism. After Frames 1-4 are decoded the frames are rendered in reverse order; i.e., Frame 4 followed by Frame 3 followed by Frame 2 followed by Frame 1. This process is identified by numbered circles 13-16.

In one embodiment, after a particular group of frames is rendered, stored data associated with that group of frames can be deleted. For example, after Frames 5-8 are displayed, stored data associated with Frames 5-8 is deleted from the memory device or other storage mechanism to release storage resources for use in storing data associated with another group of frames, such as Frames 1-4.

A similar process is used to render additional video frames prior to Frame 1. Further, a similar process is used to render, in reverse order, sequences of video frames having any length.

Figure 6:
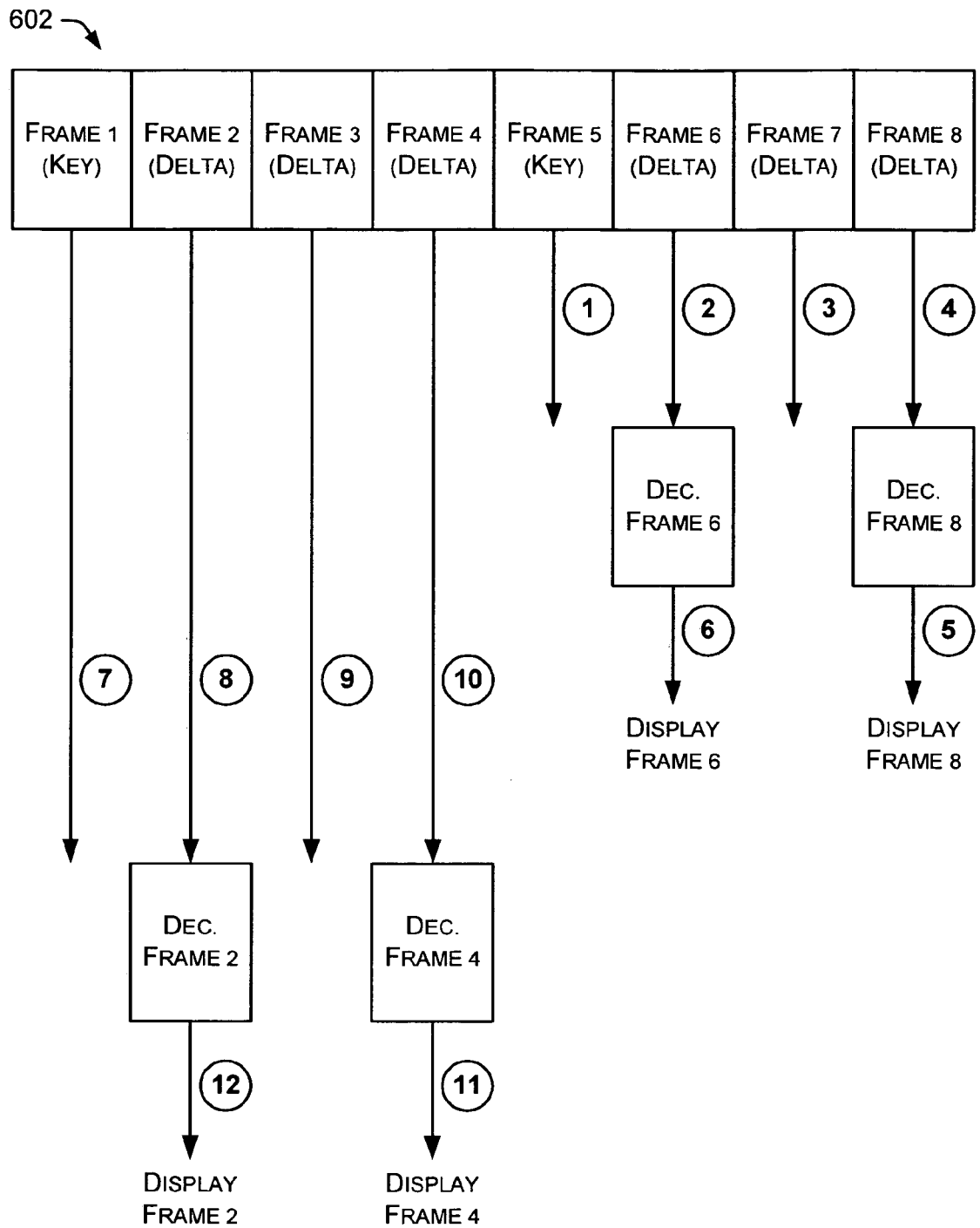
FIG. 6 illustrates another example of processing multiple frames of compressed video data such that the video data is played in a reverse direction.

FIG. 6 illustrates another example of processing multiple frames of compressed video data such that the video data is played in a reverse direction. The example of FIG. 6 reduces the memory resources (or storage resources) used during the reverse playback of video frames. This reduction in memory usage is accomplished by discarding certain video frames after decoding those frames rather than storing the decoded frames. The discarded video frames are saved until the next video frame (e.g., the adjacent video frame in the sequence) is decoded. Once the next video frame is decoded, the video frame is deleted. This process reduces the frame rate during the reverse playback of video frames in exchange for the reduction in memory resource usage.

FIG. 6 includes an example sequence of compressed video frames 602, which includes two key frames (Frame 1 and Frame 5) and three delta frames associated with each key frame. In sequence 602, Delta Frames 2-4 are associated with Frame 1 and Delta Frames 6-8 are associated with Frame 5. The order in which the sequence 602 is processed is indicated by numbered circles positioned to the right of the associated process. In the example of FIG. 6, every other video frame (Frame 8, Frame 6, Frame 4 and Frame 2) is displayed. Although every other video frame is displayed, it is necessary to decode all video frames to provide the information necessary to display subsequent frames. For example, although Frame 7 is not displayed, Frame 7 is decoded to obtain information used to generate Frame 8, which is displayed.

Frames 5-8 are decoded, as indicated by numbered circles 1-4. After decoding Frames 5-8, the data associated with decoded Frame 5 and decoded Frame 7 is discarded, thereby reducing memory usage. Data associated with decoded Frame 6 and decoded Frame 8 is stored for use in rendering those video frames. The rendering of Frame 8 is identified by numbered circle 5 and the rendering of Frame 6 is identified by numbered circle 6. While Frame 6 and Frame 8 are being rendered, Frames 1-4 are decoded, as indicated by numbered circles 7-10. This simultaneous decoding and rendering of video frames improves the performance of the reverse playback process.

After decoding Frames 1-4, the data associated with decoded Frame 1 and decoded Frame 3 is discarded, thereby reducing memory usage. Data associated with decoded Frame 2 and decoded Frame 4 is stored for use in rendering those video frames. The rendering of Frame 4 is identified by numbered circle 11 and the rendering of Frame 2 is identified by numbered circle 12. Thus, every other frame in sequence 602 is rendered—Frame 8 followed by Frame 6 followed by Frame 4 followed by Frame 2.

In alternate embodiments, more or less video frames may be discarded. For example, memory resource usage can be further reduced by storing every third video frame or storing every fourth video frame. In another embodiment, every third video frame is discarded. This embodiment requires more memory resources than the example shown in FIG. 6, but requires fewer memory resources than the example shown in FIG. 5.

In a particular embodiment, the number of video frames discarded is determined based on the amount of memory or other storage resources available for storing decoded video frames and/or the frame rate desired during reverse playback. As memory usage decreases (e.g., more frames are discarded), the frame rate during reverse playback experiences a corresponding decrease.

In another embodiment, memory usage is reduced by reducing the amount of pixel data stored for each decoded frame. Although this may reduce the resolution of the video frames displayed in during reverse playback, less memory space is required to store each video frame. In one example, the amount of pixel data is reduced by discarding (or deleting) every other pixel in a row and/or discarding (or deleting) every other row in the decoded video frame. In other examples, more or less pixel data can be discarded depending on the resolution desired and the memory storage space available.

Other embodiments apply a lossless compression algorithm to compress the decoded video frame. The compressed video frame is decompressed prior to rendering the video frame. Additionally, the decompressed video frame may be stored for access during future processing. This lossless compression algorithm does not affect the resolution of the video frame, but reduces memory usage due to the compression of the video data. Example lossless compression algorithms include GIF (Graphics Interchange Format) and PNG (Portable Network Graphics).

Figure 7:
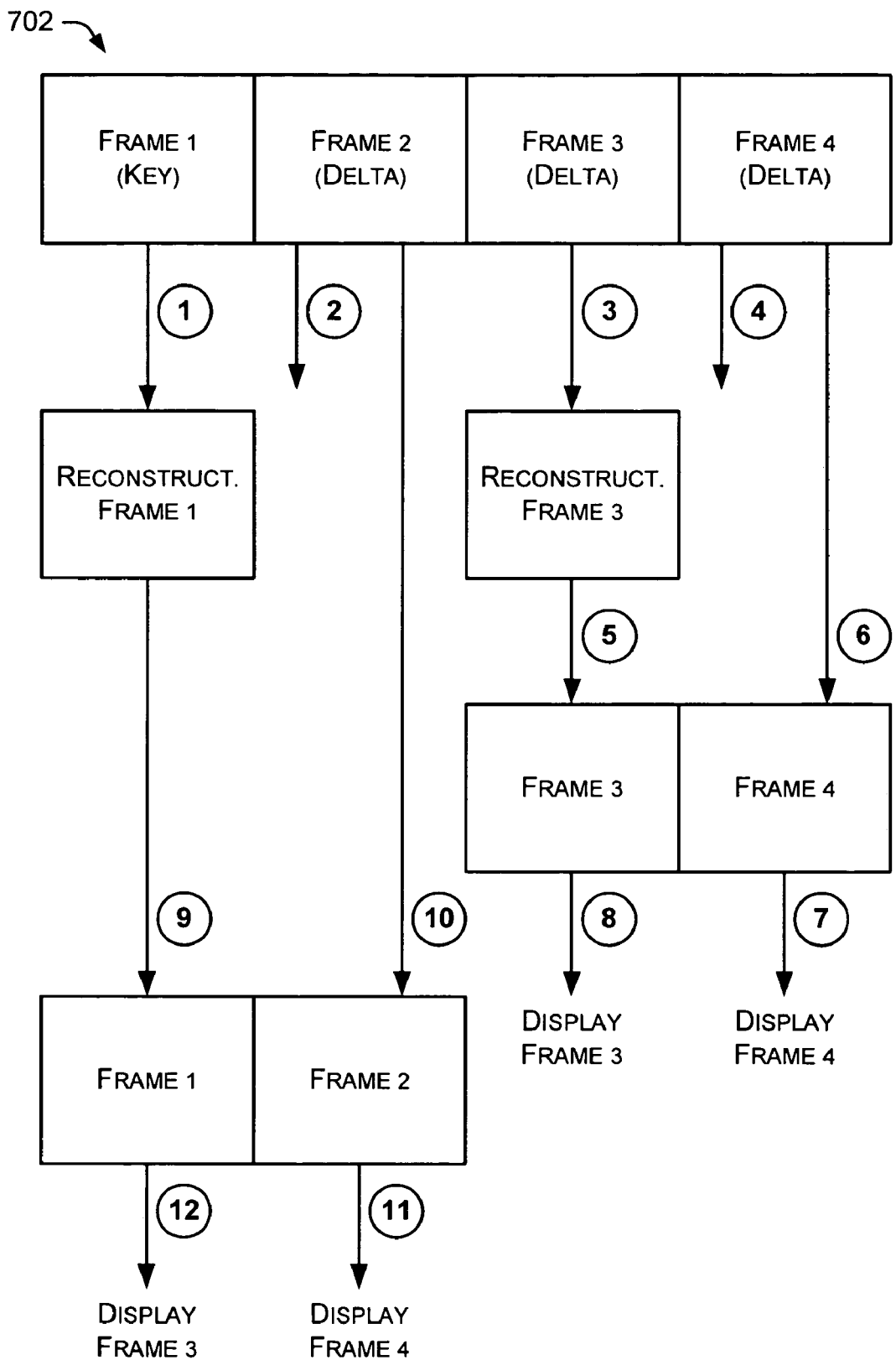
FIG. 7 illustrates another example of processing multiple frames of compressed video data such that the video data is played in a reverse direction.

FIG. 7 illustrates another example of processing multiple frames of compressed video data such that the video data is played in a reverse direction. This example uses a reconstructed frame mechanism available in certain video decompression implementations. A reconstructed frame is a video frame that can be created from the decoding state of the video decompression component, such as video decoder 304 in FIG. 3. A reconstructed frame can be created from any frame (e.g., a key frame or a delta frame) while decoding a sequence of video frames. After a reconstructed frame is created, the reconstructed frame can be used as a key frame to begin a decoding process. The reconstructed frame has a format that is different from a decoded frame that is ready for display.

FIG. 7 includes a sequence of compressed video frames 702. In a particular example, a process decodes Frame 1, Frame 2 and Frame 3. The process then creates a reconstructed video frame for Frame 3 and stores this reconstructed video frame. If, at a later time, it is necessary to decode Frame 4, the decoding process can start with reconstructed Frame 3, rather than repeating the decoding of Frame 1, Frame 2 and Frame 3. In this example, the decoding process simply decodes Frame 4 using reconstructed Frame 3.

In one embodiment, a process decodes all frames in the sequence of compressed video frames 702 (i.e., Frame 1, Frame 2, Frame 3 and Frame 4). This decoding is identified by numbered circles 1-4. After decoding Frames 1-4, the process creates reconstructed frames for Frame 1 and Frame 3. The results of decoding Frame 2 (numbered circle 2) and Frame 4 (numbered circle 4) are discarded.

At a future time, a request is received to play the sequence of compressed video frames 702 in reverse order. In response to this request, Frame 3 is decoded using the reconstructed Frame 3, indicated by numbered circle 5. Frame 4 is then decoded in the normal manner using information regarding decoded Frame 3, as indicated by numbered circle 6. The reverse playback process then displays Frame 4 followed by Frame 3, indicated by numbered circles 7 and 8, respectively.

The reverse playback continues by decoding Frame 1 using the reconstructed Frame 1 (numbered circle 9) and decodes Frame 2 in the normal manner using information regarding decoded Frame 1 (numbered circle 10). Next, the process displays Frame 2 followed by Frame 1, indicated by numbered circles 11 and 12, respectively. In a particular embodiment, the display of Frames 4 and 3 (numbered circles 7 and 8) is performed simultaneously with the decoding of Frames 1 and 2 (numbered circles 9 and 10) to improve the performance of the reverse playback process.

In the example of FIG. 7, reconstructed frames are stored in system memory and decoded frames are stored in video memory. Images are typically rendered from data stored in video memory. During reverse playback of video data, the reconstructed frames are accessed from system memory. The reconstructed frames are used to create one or more decoded video frames that are stored in video memory.

Another embodiment using reconstructed frames stores every Nth reconstructed frame and discards the remaining video frames, where N is an integer. For example, N can be calculated as the integer portion of the square root of the number of video frames in a group of frames. A group of frames includes a key frame and one or more associated delta frames. Thus, a group that includes one key frame and eight associated delta frames (a total of nine frames) stores every third reconstructed frame and discards the remaining video frames. In another example, a group includes one key frame and 90 associated delta frames (a total of 91 frames). The square root of 91 is 9.54—thus, the integer portion is "9". In this situation, every 9th reconstructed frame is stored and the remaining frames are discarded. This embodiment displays all frames during reverse playback of the video data and reduces memory or other storage usage. During the reverse playback process, video frames are decoded using the associated reconstructed frame. In other embodiments, more or fewer decoded frames are stored in memory depending on the amount of memory usage required and the amount of processing resources available.

In alternate embodiments, a system operator or other user may select the value of N. Additionally, various other algorithms or formulas are used to calculate a value for N. A particular embodiment may discard N of every P frames where N and P are integers, such as discarding 3 of every 8 frames or discarding 17 of every 22 frames.

Audio data may be compressed using any number of compression formats, such as WMA (Windows Media Audio) and MP3 (MPEG, audio layer 3). Many compressed audio formats use audio blocks that represent audio packets. The audio blocks typically have a fixed size in bytes. One or more audio packets are contained within the audio blocks. Multiple audio packets may be contained in an audio block or a particular audio packet may span multiple audio blocks. The boundaries of the audio blocks do not necessarily align with audio packet boundaries.

In one embodiment, a multimedia application provides audio blocks to an audio decoder in sequential order to produce uncompressed audio data suitable for playback on an audio device, such as a speaker. When a sequence of multiple audio blocks is decoded, any data packets that span multiple audio blocks are properly decoded to provide a full sequence of uncompressed audio data.

Particular embodiments may decode video data and/or audio data to an intermediate format (also referred to as "intermediate data"), such as a partially decoded data frame or data packet that requires additional processing before rendering or playing. In these embodiments, the intermediate data may be used to decode subsequent data and/or further processed to render or play the current data.

Figure 8:
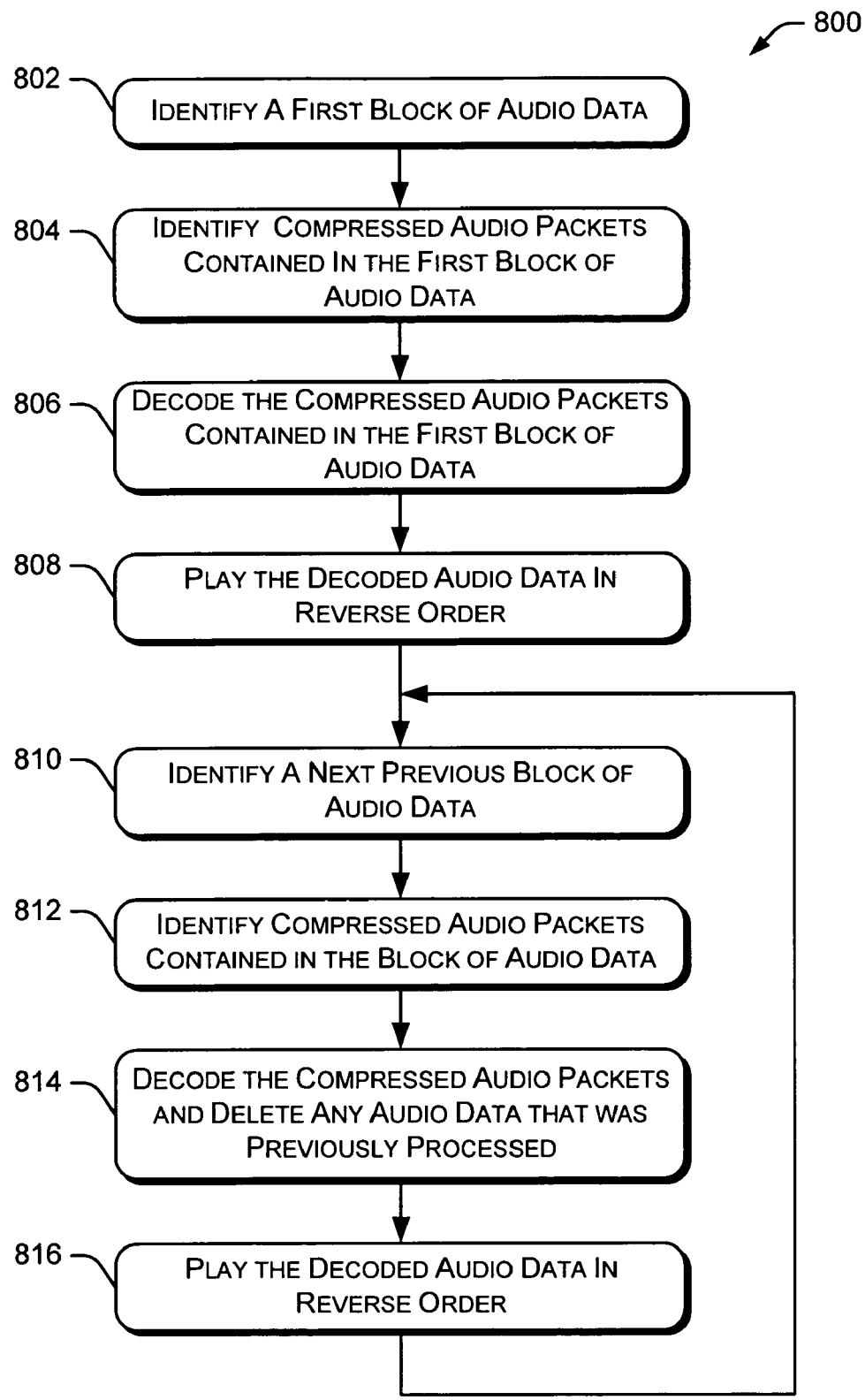
FIG. 8 is a flow diagram illustrating an embodiment of a procedure for playing compressed audio data in a reverse direction.

FIG. 8 is a flow diagram illustrating an embodiment of a procedure 800 for playing compressed audio data in a reverse direction. Initially, a first block of audio data is identified (block 802). The first block of audio data is the block of data with which reverse audio playback is to begin. The procedure identifies compressed audio packets contained in the first block of audio data (block 804).

At block 806, procedure 800 decodes the compressed audio packets contained in the first block of audio data. Additionally, the procedure may store the lowest timestamp value associated with the uncompressed audio data. The decoded audio data is then played in reverse order (block 808). The procedure continues by identifying a next previous block of audio data (block 810) and identifying compressed audio packets contained in the block of audio data (block 812). The procedure then decodes the compressed audio packets and deletes (or ignores) any audio data that was previously processed (block 814), e.g., processed as part of the previous block of audio data. Previously processed audio data can be identified using the timestamp information saved as part of decoding the compressed audio packets in block 806. Finally, procedure 800 plays the decoded audio data in reverse order (block 816). The procedure then returns to block 810 and repeats the above process until all blocks of audio data have been processed and played in reverse order.

In a particular embodiment of procedure 800, if there are no audio packets wholly contained in a particular block of audio data, the process does not process the audio packets in the particular block of data and, instead, continues by identifying a next previous block of audio data.

In other embodiments, certain audio packets may be dependent on other audio packets for decoding. In these embodiments, key packets can be independently decoded and played without referencing previously decoded packets. Other packets (e.g., delta packets) identify differences between the current packet and a previously decoded packet. Thus, to play a delta packet, the decoding process accesses one or more previously decoded packets to reconstruct the audio packet. This approach allows a compression algorithm to take advantage of similarities between audio packets to improve compression efficiency. In these embodiments in which certain audio packets have a dependency upon one another, the audio decoding process locates key packets (or a next previous key packet) and then decodes subsequent audio packets until the next key packet is reached. This audio decoding process may be similar to any of the video decoding processes discussed above that process video data containing key frames and delta frames.

Figure 9:
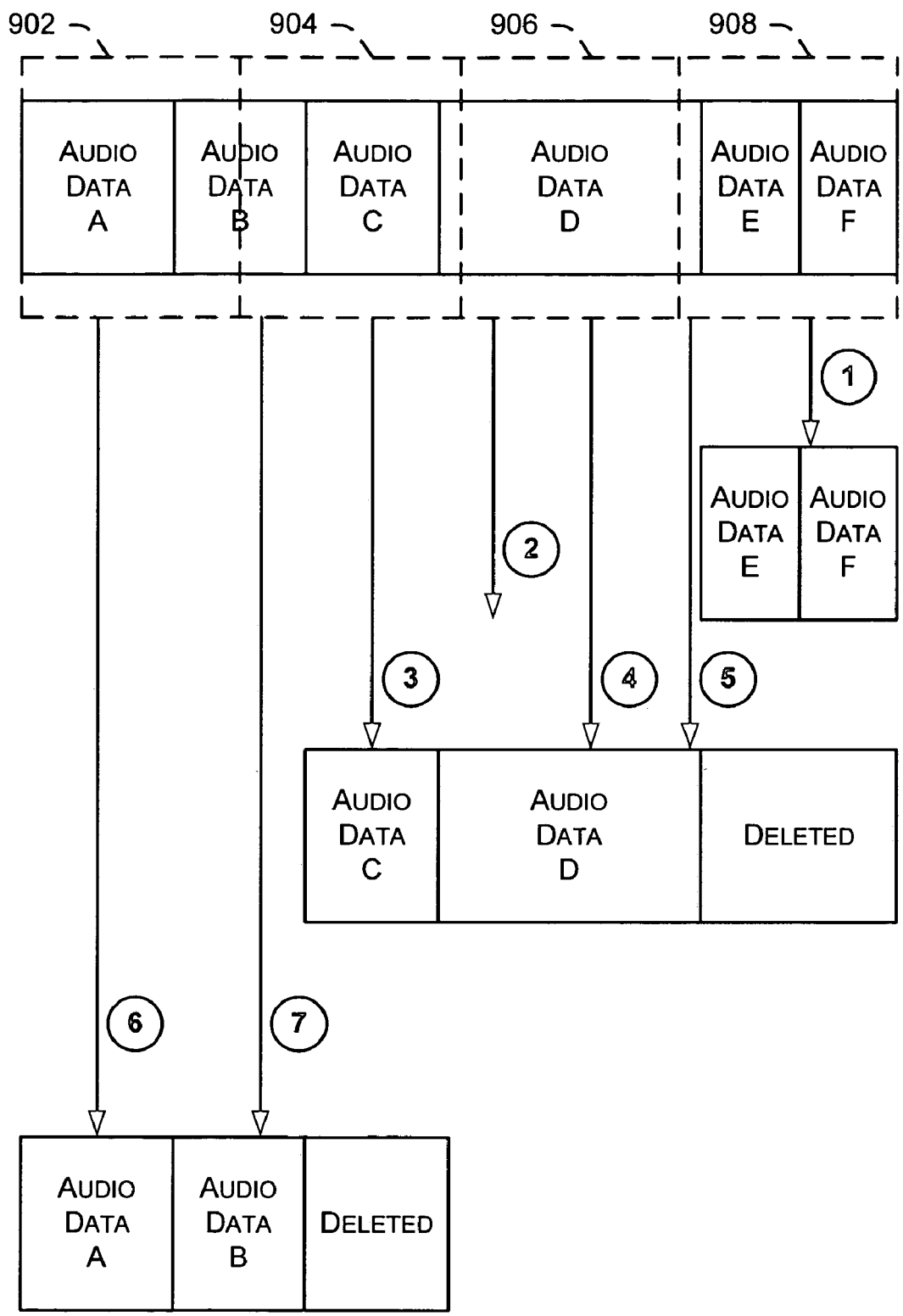
FIG. 9 illustrates an example of processing multiple frames of compressed audio data such that the audio data is played in a reverse direction.

FIG. 9 illustrates an example of processing multiple frames of compressed audio data such that the audio data is played in a reverse direction. The example of FIG. 9 contains four audio blocks represented by broken lines 902, 904, 906 and 908. This example also includes six compressed audio packets labeled Audio Data A, Audio Data B, Audio Data C, Audio Data D, Audio Data E and Audio Data F. In one implementation, each audio block 902-908 represents one second of audio data.

The audio data shown in FIG. 9 is played in the reverse direction by decoding the audio blocks 902-908 in small forward segments to generate the necessary data to play the audio data in reverse order. The audio data is processed by decoding the last audio block 908 and playing the decoded audio data backwards. The process also keeps track of the lowest timestamp associated with audio data that has been decoded. In the example of FIG. 9, decoding audio block 908 generates Audio Data E and Audio Data F (the two audio packets wholly contained in audio block 908) indicated by numbered circle 1. Decoded Audio Data E and Audio Data F is then played in reverse order.

Next, the process decodes audio block 906 which generates no data (identified by numbered circle 2) because there are no audio packets wholly contained in block 906. The process continues by decoding audio block 904, 906 and 908 to generate Audio Data C, Audio Data D, Audio Data E and Audio Data F (identified by numbered circles 3, 4 and 5). The generation of Audio Data E and Audio Data F can be discarded because those audio packets were already played in reverse order. Thus, decoded Audio Data C and Audio Data D is played in reverse order.

Finally, the process decodes audio block 902 and 904 to generate Audio Data A, Audio Data B and Audio Data C (identified by numbered circles 6 and 7). The generation of Audio Data C is discarded because that audio packet was already played in reverse order. Thus, decoded Audio Data A and Audio Data B is played in reverse order, thereby completing the reverse playback of audio blocks 902-908.

Figure 10:
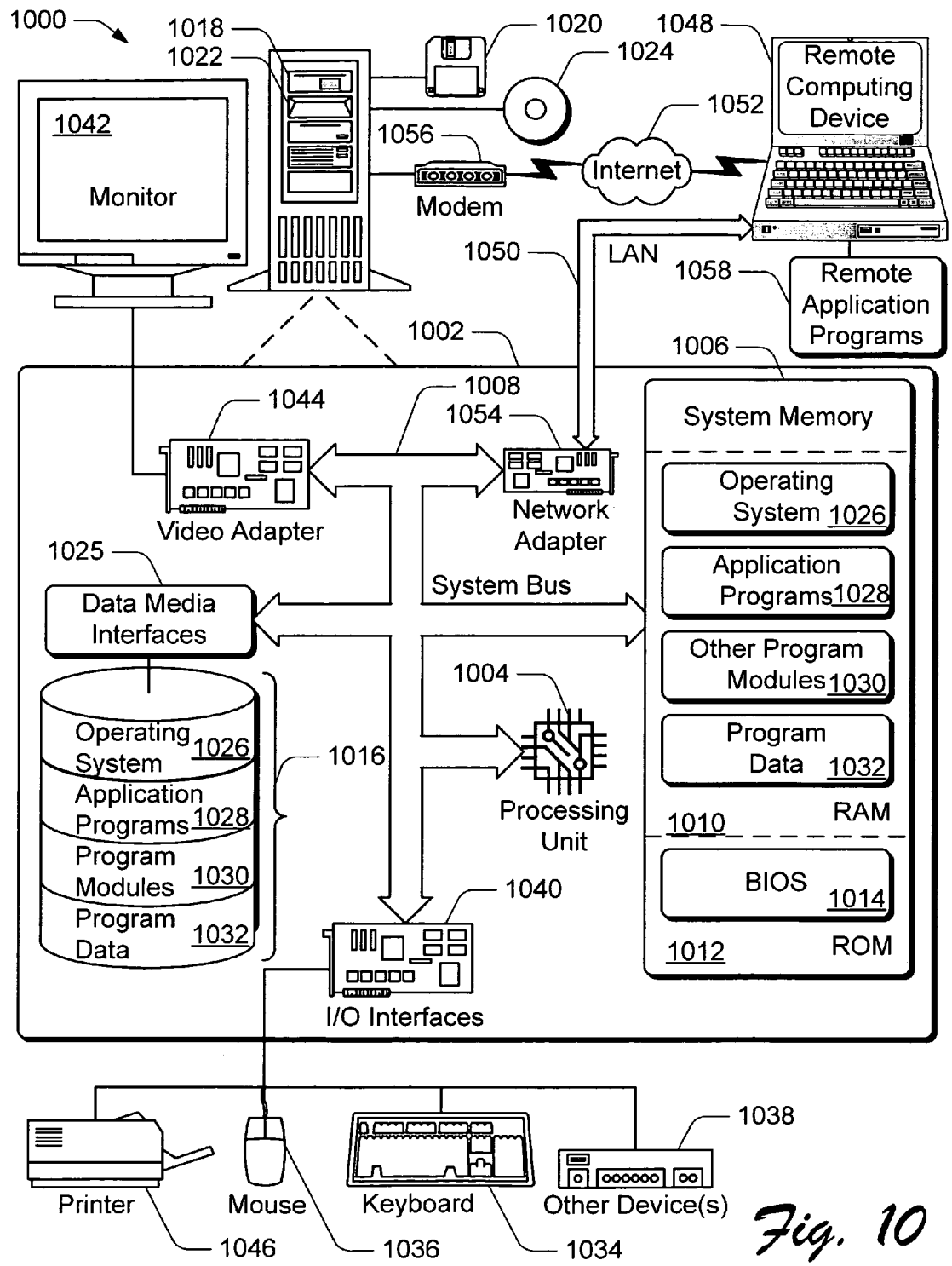
FIG. 10 illustrates a general computer environment, which can be used to implement the techniques described herein.

FIG. 10 illustrates a general computer environment 1000, which can be used to implement the techniques described herein. The computer environment 1000 is only one example of a computing environment and is not intended to suggest any limitation as to the scope of use or functionality of the computer and network architectures. Neither should the computer environment 1000 be interpreted as having any dependency or requirement relating to any one or combination of components illustrated in the example computer environment 1000.

Computer environment 1000 includes a general-purpose computing device in the form of a computer 1002. One or more media player applications can be executed by computer 1002. The components of computer 1002 can include, but are not limited to, one or more processors or processing units 1004 (optionally including a cryptographic processor or co-processor), a system memory 1006, and a system bus 1008 that couples various system components including the processor 1004 to the system memory 1006.

The system bus 1008 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1002 typically includes a variety of computer readable media. Such media can be any available media that is accessible by computer 1002 and includes both volatile and non-volatile media, removable and non-removable media.

The system memory 1006 includes computer readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 may also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024 such as a CD-ROM, DVD-ROM, or other optical media. The hard disk drive 1016, magnetic disk drive 1018, and optical disk drive 1022 are each connected to the system bus 1008 by one or more data media interfaces 1025. Alternatively, the hard disk drive 1016, magnetic disk drive 1018, and optical disk drive 1022 can be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, a removable magnetic disk 1020, and a removable optical disk 1024, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 1016, magnetic disk 1020, optical disk 1024, ROM 1012, and/or RAM 1010, including by way of example, an operating system 1026, one or more application programs 1028, other program modules 1030, and program data 1032. Each of such operating system 1026, one or more application programs 1028, other program modules 1030, and program data 1032 (or some combination thereof) may implement all or part of the resident components that support the distributed file system.

A user can enter commands and information into computer 1002 via input devices such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device can also be connected to the system bus 1008 via an interface, such as a video adapter 1044. In addition to the monitor 1042, other output peripheral devices can include components such as speakers (not shown) and a printer 1046 which can be connected to computer 1002 via the input/output interfaces 1040.

Computer 1002 can operate in a networked environment using logical connections to one or more remote computers, such as a remote computing device 1048. By way of example, the remote computing device 1048 can be a personal computer, portable computer, a server, a router, a network computer, a peer device or other common network node, game console, and the like. The remote computing device 1048 is illustrated as a portable computer that can include many or all of the elements and features described herein relative to computer 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which can be internal or external to computer 1002, can be connected to the system bus 1008 via the input/output interfaces 1040 or other appropriate mechanisms. It is to be appreciated that the illustrated network connections are exemplary and that other means of establishing communication link(s) between the computers 1002 and 1048 can be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048. For purposes of illustration, application programs and other executable program components such as the operating system are illustrated herein as discrete blocks, although it is recognized that such programs and components reside at various times in different storage components of the computing device 1002, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a request to play compressed multimedia data in a reverse direction;
   identifying compressed video data in the compressed multimedia data;
   identifying compressed audio packets associated with the compressed video data;
   identifying a most recent key frame previously received;
   identifying a most recent audio key packet previously received;
   decoding the most recent key frame;
   decoding the most recent audio key packet;
   identifying delta frames received subsequent to the most recent key frame;
   identifying audio delta packets received subsequent to the most recent audio key packet;
   decoding the identified delta frames;
   decoding the identified audio delta packets;
   reducing an amount of data associated with each pixel in each decoded delta frame by:
   deleting alternating rows of pixels in each decoded delta frame; and
   deleting alternating pixels in non-deleted rows of pixels in each decoded delta frame;
   storing the reduced amount of data associated with each decoded delta frame;
   discarding alternating audio delta packets;
   deleting N of P delta frames, wherein N and P are integers and wherein N is determined based on a combination of the amount of memory available for storing decoded video frames and the frame rate desired during reverse playback; and
   playing the remaining identified delta frames in the reverse direction and concurrently playing the remaining decoded audio packets in reverse order.

2. A method as recited in claim 1 further comprising storing the identified delta frames that were not deleted.

3. A method as recited in claim 1 further comprising playing the decoded key frame after playing the remaining identified delta frames in the reverse direction.

4. A method as recited in claim 1 wherein decoding the identified delta frames includes utilizing information contained in the most recent key frame.

5. A method as recited in claim 1 wherein decoding the identified delta frames includes utilizing information contained in the most recent key frame and information contained in any intervening delta frames.

6. One or more computer-readable memories containing a computer program that is executable by a processor to perform the method recited in claim 1.

7. A method as recited in claim 1 further comprising using a reconstructed video frame as a key frame to begin a decoding process, wherein:
   the reconstructed video frame is created from a decoding state of a video decompression component;
   the reconstructed video frame is independent from the frame decoded by the video decompression component, such that:
   in an event that the video frame decoded by the video decompression component was a key frame, the created reconstructed video frame will serve as the key frame;
   in an event that the video frame decoded by the video decompression component was a delta frame, the created reconstructed video frame will serve as the key frame; and
   the reconstructed video frame has a format that is different from a decoded frame which is ready for display.

8. A method as recited in claim 7 further comprising storing the decoded video frames in video memory and storing the reconstructed video frames in system memory.

9. An apparatus for playing compressed multimedia data, the apparatus comprising:
   a multimedia application facilitating identifying audio delta packets received subsequent to a most recent audio key packet by:
   identifying compressed video data in the compressed multimedia data, wherein the compressed video data comprises delta frames; and
   identifying compressed audio packets associated with the compressed video data, wherein the compressed audio packets comprise:
   audio key packets; and
   audio delta packets;
   an audio decoder coupled to receive compressed audio data and decode the compressed audio data comprising the identified audio delta packets;
   an audio data store coupled to the audio decoder;
   a video decoder coupled to receive compressed video data and decode the compressed video data;
   a video data store coupled to the video decoder, wherein the video data store stores P minus N delta frames, N and P are integers, and N is determined based on a combination of an amount of memory available for storing decoded video frames and a frame rate desired during reverse playback; and
   a reverse playback controller coupled to the audio decoder and the video decoder, wherein the reverse playback controller generates decoded audio data and decoded video data in a reverse direction.

10. An apparatus as recited in claim 9 wherein the compressed video data includes at least one key frame and a plurality of delta frames associated with the key frame.

11. An apparatus as recited in claim 9 wherein the reverse playback controller discards alternating packets of received audio data.

12. An apparatus as recited in claim 9 wherein the video decoder deletes alternating frames of received video data.

13. An apparatus as recited in claim 9 wherein the reverse playback controller is further coupled to receive forward playback instructions and reverse playback instructions.

14. One or more computer storage media having stored thereon a computer program that, when executed by one or more processors, causes the one or more processors to perform a method comprising:
   receiving a request to play compressed multimedia data in a reverse direction;
   identifying a most recent video key frame received in the compressed multimedia data;
   decoding the most recent video key frame;
   identifying video delta frames received after the most recent video key frame;
   decoding the identified video delta frames;

identifying at least one compressed audio packet in the compressed multimedia data;

identifying a most recent audio key packet previously received;

decoding the most recent audio key packet;

identifying audio delta packets received subsequent to the most recent audio key packet;

decoding the identified audio delta packets;

deleting N of P delta frames, wherein N and P are integers and wherein N is determined based on a combination of the amount of memory available for storing decoded video frames and the frame rate desired during reverse playback; and playing the decoded video delta frames and the decoded audio packet in the reverse direction.

15. One or more computer storage media as recited in claim 14 wherein alternating video delta frames are deleted after decoding the alternating video delta frames.

16. One or more computer storage media as recited in claim 14 wherein the one or more processors further:
apply a lossless compression algorithm to each of the decoded video delta frames; and
store each of the compressed video delta frames.

17. One or more computer storage media as recited in claim 14 wherein the one or more processors further store the decoded video delta frames and the decoded audio packet.

* * * * *